United States Patent
Matsuno et al.

(10) Patent No.: US 6,894,124 B2
(45) Date of Patent: May 17, 2005

(54) HIGH SOLID PAINT COMPOSITIONS

(75) Inventors: Yoshizumi Matsuno, Hadano (JP); Hiroyuki Onoda, Atsugi (JP); Takashi Noguchi, Hiratsuka (JP); Hisashi Isaka, Atsugi (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 180 days.

(21) Appl. No.: 09/984,793

(22) Filed: Oct. 31, 2001

(65) Prior Publication Data

US 2002/0082341 A1 Jun. 27, 2002

(30) Foreign Application Priority Data

| Nov. 1, 2000 | (JP) | 2000-334638 |
| Nov. 1, 2000 | (JP) | 2000-334639 |
| Mar. 21, 2001 | (JP) | 2001-079727 |
| May 23, 2001 | (JP) | 2001-153437 |
| May 23, 2001 | (JP) | 2001-153438 |

(51) Int. Cl.$^7$ .................... C09D 161/28; C09D 175/04; C09D 175/06; C08L 61/28; C08L 75/06

(52) U.S. Cl. .................... 525/509; 427/385.5; 427/387; 427/407.1; 525/123; 525/125; 525/127; 525/131; 525/440; 525/453; 525/454; 525/455; 525/456; 525/460; 525/474; 525/476; 525/479; 525/512; 525/514; 525/528; 528/28; 528/59; 528/60; 528/65; 528/66; 528/73; 528/80; 528/85

(58) Field of Search .................... 427/385.5, 387, 427/407.1; 525/123, 125, 127, 131, 440, 453, 454, 455, 456, 460, 474, 476, 479, 509, 512, 514, 528; 528/59, 60, 65, 66, 73, 80, 85, 28

(56) References Cited

U.S. PATENT DOCUMENTS

| 3,928,420 | A | * | 12/1975 | Fang ............................ 560/90 |
| 4,104,240 | A | * | 8/1978 | Buter .......................... 524/539 |
| 4,113,702 | A | * | 9/1978 | Psencik ...................... 528/297 |
| 4,379,906 | A | | 4/1983 | Chattha ....................... 528/75 |
| 4,403,093 | A | * | 9/1983 | Hartman et al. ............ 528/297 |
| 4,859,743 | A | | 8/1989 | Ambrose et al. ........... 525/443 |
| 5,646,213 | A | * | 7/1997 | Guo ............................ 524/562 |
| 5,952,452 | A | * | 9/1999 | Aerts et al. ................. 528/297 |
| 6,180,175 | B1 | | 1/2001 | Saika et al. ................. 427/387 |
| 6,277,497 | B1 | * | 8/2001 | Aerts et al. ................. 428/482 |
| 6,294,607 | B1 | * | 9/2001 | Guo et al. ................... 524/507 |
| 6,433,125 | B1 | * | 8/2002 | Gruetzmacher et al. ...... 528/73 |

FOREIGN PATENT DOCUMENTS

| CA | 2102169 | | 5/1994 |
| DE | 196 49 394 | | 6/1998 |
| DE | 198 24 118 | | 12/1999 |
| EP | 0 029 598 | | 6/1981 |
| EP | 596460 | * | 5/1994 |
| JP | 11-5943 | * | 1/1999 |
| WO | 99/03908 | * | 1/1999 |
| WO | 00/24836 | | 5/2000 |

OTHER PUBLICATIONS

WPI Abstract No. 1999–136852[12] and JP 11005943.

* cited by examiner

*Primary Examiner*—Rabon Sergent
(74) *Attorney, Agent, or Firm*—Wenderoth, Lind & Ponack, L.L.P.

(57) ABSTRACT

This invention provides high solid paint compositions comprising as the basic components a hydroxyl-containing compound having a weight-average molecular weight of not more than 1,000 and a hydroxyl value of 200–800 mgKOH/g, and a polyisocyanate compound, and a process for forming multi-layered coating film using any of said compositions.

23 Claims, No Drawings

HIGH SOLID PAINT COMPOSITIONS

This invention relates to novel high solid paint compositions and processes for forming multi-layered coating film using the compositions.

In the field of paint, reduction in use amount of organic solvent is now an important task, for environmental preservation against atmospheric pollution and saving resources. As a measure to accomplish this task, development of paint compositions whose solid concentration is raised by reducing the organic solvent content of the paint, which are referred to as "high solid paint compositions" is drawing attentions.

Most of currently proposed high solid paint compositions comprise hydroxyl-containing resins blended with melamine resins which serve as the curing agent. Whereas, attempts to raise solid concentration in paints by reducing molecular weight of resins to decrease viscosity of the compositions invite a problem of deterioration in coating performance. On the other hand, when low molecular weight resins are used with introduction of more crosslinkable functional groups such as hydroxyl group for maintaining satisfactory coating performance, viscosity of resulting compositions rises due to interaction between these functional groups, rendering viscosity reduction difficult. Furthermore, when a large amount of melamine resin is blended, side-products such as alcohol is generated voluminously during curing under heat, giving rise to a problem of popping (foaming) in the coating film.

Top coating film containing melamine resin, which is applied on outside plating of automobiles which are used outdoors, is apt to develop etching or stains under acid precipitation and also is susceptible to mars or scratches caused by car-washing machine. Whereas, polyisocyanate compounds themselves generally have lower viscosity than melamine resins, and top coating paints containing polyisocyanate compounds as crosslinking agent can be easily given high solid concentration, and furthermore their coating film excels in resistance to acid precipitation, resistance to mars caused by car-washing and also in finish appearance (e.g., gloss, fatness and distinctness-of-image-gloss). At high concentration levels of 70 weight % or higher solid content, however, they are subject to a defect of insufficient hardness of cured coating film.

A main object of the present invention is to provide novel high solid paint compositions which have low viscosity and yet do not exhibit deterioration in coating film performance and are capable of forming coating film excelling, among other properties, particularly in finish appearance, hardness, resistance to acid precipitation and mar resistance.

A further object of the present invention is to provide processes for forming multi-layered coating film using said high solid compositions.

Still other objects and characteristics of the present invention will become apparent from reading the following descriptions.

According to the invention, a high solid paint composition (Composition I) which comprises the following components:

(A) a hydroxyl-containing compound having a weight-average molecular weight not more than 1,000 and a hydroxyl value of 200–800 mgKOH/g, and (B) a polyisocyanate compound is provided.

The invention also provides a high solid paint composition (Composition II) which comprises, in addition to the above components (A) and (B):

(C) a melamine resin.

The invention furthermore provides a high solid paint composition (Composition III) which comprises, in addition to the above components (A), (B) and (C):

(D) a hydroxyl-containing resin having a weight-average molecular weight of 500–6,000 and a hydroxyl value of 50–600 mgKOH/g.

The invention still further provides a high solid paint composition (Composition IV) which comprises, in addition to the above components (A), (B), (C) and (D):

(E) an alkoxysilyl-containing compound.

Still in addition, the invention provides processes for forming multi-layered coating film composed of at least one colored coating layer and at least one transparent layer, characterized by forming the top transparent coating layer using a high solid paint composition selected from Compositions I–IV of the present invention.

Hereinafter the high solid paint compositions and the processes for forming the multi-layered coating film using said compositions of the invention are explained in further details.

Component (A):

As the hydroxyl-containing compound (A) serving as the base resin component of the paint compositions according to the present invention, those having relatively low molecular weight of not more than 1,000 in terms of weight-average molecular weight, containing on average at least two hydroxyl groups per molecule and having a hydroxyl value within a range of 200–800 mgKOH/g are used. So long as the foregoing requirements are met, their kind is not critical while use of a ring-opening esterification reaction product (A-1) between a carboxyl-containing compound and epoxy-containing compound as the component (A) is preferred for achieving the object of the invention.

Said ring-opening esterification reaction product (A-1) can be prepared by a ring-opening esterification reaction between carboxyl group(s) of a carboxyl-containing compound and epoxy group(s) of an epoxy-containing compound, and the resulting reaction product contains at least the hydroxyl group(s) formed upon ring-opening of said epoxy group(s).

Those carboxyl-containing compounds useful for preparing said reaction product (A-1) include aliphatic and aromatic mono- or poly-carboxylic acids containing at least one carboxyl group per molecule having a molecular weight ranging from 60 to 800, in particular, 100 to 500, specific examples including: monocarboxylic acids such as acetic, propionic, butyric, 2-ethylhexanoic, octanoic, dode-canoic, palmitic, stearic, oleic, pivalic, Versatic and benzoic acids; polycarboxylic acids such as succinic, adipic, azelaic, sebacic, didode-canoic, tetrahydrophthalic, phthalic, butanetricarboxylic, butane-tetracarboxylic acids and trimellitic anhydride; hydroxy acids such as glycolic, lactic, malic, citric, tartaric, hydroxypivalic, dimethylolpropionic, dimethylolbutanoic and gluconic acids; and anhydrides of those acids. Also those formed by advance reaction of said anhydrides with glycols may be used, specific examples including reaction products of trimethylolpropane with hexahydrophthalic anhydride and those of trimethylolpropane with succinic anhydride. Of those, hydroxy acids in which hydroxyl groups and carboxyl groups are concurrently present, and reaction products of such anhydrides with glycols, in particular, hydroxy acids, are preferred because they enable introduction of many hydroxyl groups into the reaction products (A-1).

On the other hand, epoxy-containing compounds which are to be reacted with above carboxyl-containing compounds may be those known per se, containing at least one epoxy group per molecule, specific examples including:

(a) glycidol, (b) epoxy-containing compounds obtained through etherification reaction between hydroxyl-containing compounds and epihalohydrins, (c) epoxy-containing compounds obtained through esterification reactions between carboxyl-containing compounds and epihalohydrins, and (d) epoxy-containing compounds obtained through reactions between unsaturated group-containing compounds and peroxides.

The above (a) glycidol is same to 2,3-epoxy-1-propanol which can be obtained, for example, through a reaction of allyl alcohol with benzoic or tungstic acid, and hydrogen peroxide.

Examples of above (b) hydroxyl-containing compound include: aromatic hydroxyl-containing compounds such as phenol bisphenol A, bisphenol F, phenol-novolak resin, orthocresol-novolak resin and bromides of the foregoing; alicyclic hydroxyl-containing compound such as hydrogenated bisphenol A, $C_1$–$C_{20}$ aliphatic mono-alcohols such as methanol, ethanol, propanol and octanol; and $C_2$–$C_{20}$ aliphatic polyols such as ethylene glycol popylene glycol hexanediol, diethylene glycol, neopentyl glycol, glycerine, trimethylolpropane, pentaerythritol and dipentaerythritol. As the epihalohydrins, epichlorohydrin can be suitably used. The etherification reaction between a hydroxyl-containing compound and an epihalohydrin is performed by a method known per se, and whereupon a glycidyl ether-type epoxy-containing compound (b) is obtained. As commercially available products corresponding to such epoxy-containing compounds (b), for example, "Denacol™ EX-313", "Denacol™ EX-321", "Denacol™ EX-421", "Denacol™ EX-611", etc. (Nagase Chemicals Ltd.) can be named.

As the (c) carboxyl-containing compound, for example, those exemplified as being useful for preparing above reaction products (A-1) component are similarly useful. The esterification reaction of such carboxyl-containing compound with epihalohydrin, in particular, epichlorohydrin, can be performed by a method known per se, to produce glycidyl ester-type epoxy-containing compound (c). As commercially available products corresponding to such epoxy-containing compounds (c), for example, "Cardura™ E10" (Shell Oil Co.), "Glydexx™ N10" (Exxon Co.) and "Araldite™ PT910" (Ciba Geigy) may be named.

As examples of (d) epoxy-containing compound obtained through reaction of a unsaturated group-containing compound with peroxide, commercially available "Celoxide™ 2021" and "Celoxide™ 3000" (Daicel Chemical Industries, Ltd.) may be named.

Of those epoxy-containing compounds, glycidyl ester-type epoxy-containing compounds of (c) above, in particular, glycydyl esters containing hydrophobic groups, are preferred.

While the ring-opening esterification reaction of such carboxyl-containing compounds with epoxy-containing compounds progresses at room temperature, it is preferred to perform the reaction under elevated temperature of 100–160° C., inter alia, 115–150° C., in the absence of any catalyst.

The hydroxyl-containing compound serving as component (A) has a weight-average molecular weight not more than 1,000, preferably 250–850, inter aha, 300–700, contains at least two hydroxyl groups per molecule and has a hydroxyl value of 200–800 mgKOH/g, preferably 200–700 mgKOH/g, inter alia, 300–600 mgKOH/g. When a hydroxyl-containing compound as component (A) has a weight-average molecular weight greater than 1,000, it becomes difficult to give a high solid content to the composition. Whereas, when the hydroxyl value is less than 200, curability of the composition becomes inferior. When the value becomes greater than 800 on the other hand, compatibility with component (B) polyisocyanate compound tends to be impaired.

Component (B):

Polyisocyanate compound (B), which is used as crosslinking agent in the paint compositions of the present invention, is an (unblocked) compound containing at least two free isocyanate groups per molecule. Any of such compounds known per se can be used. More specifically, for example, aliphatic polyisocyanates such as hexamethylene diisocyanate, trimethylhexamethylene diisocyanate, dimeric acid diisocyanate and lysine diisocyanate; alicyclic polyisocyanates such as hydrogenated xylylene diisocyanate, cyclohexylene diisocyanate, methylenebis(cyclohexylisocyanate) and isophorone diisocyanate; aromatic polyisocyanates such as tolylene diisocyanate, phenylene diisocyanate, 4,4'-diphenylmethane diisocyanate, xylylene diisocyanate, tetramethylxylylene diisocyanate and naphthalene diisocyanate; trivalent or higher other organic polyisocyanate compounds such as 2-isocyanatoethyl-2,6-diisocyanatocaproate, 3-isocyanatomethyl-1,6-hexamethylene diisocyanate and 4-isocyanato-methyl-1,8-octamethylene diisocyanate (which is often referred to as triamino-nonane triisocyanate); dimers and trimers of these polyisocyanate compounds; and prepolymers formed through urethanation reaction of these polyisocyanate compounds with polyhydric alcohol, low-molecular polyester resins or water and the like in excessive presence of isocyanate groups may be named.

Of those polyisocyanate compounds (B), hexamethylene diisocyanate, methylenebis(cyclohexylisocyanate), isophorone diisocyanate, their dimers and trimers and prepolymers containing isocyanate groups derived from these diisocyanates are preferred. Preferred polyisocyanate compounds (B) have number-average molecular weight not more than 2,000, in particular, within a range of 200–1,000.

As the component (B), above-described unblocked polyisocyanate compounds may optionally be used concurrently with blocked polyisocyanate compounds in which isocyanate groups are blocked.

Blocked polyisocyanate compounds are those in which isocyanate groups in the above-described polyisocyanate compounds are blocked with a blocking agent. As such, those which are stable at normal temperature but regenerate free isocyanate groups when heated to baking temperature (normally from about 100 to about 200° C.) of coating film, dissociating the blocking agent, are preferred. Examples of blocking agent which is used for preparation of such blocked isocyanate compounds include phenols, oximes, lactams, alcohols, mercaptanes and active methylene compounds such as diethyl malonate. The use rate of these blocked polyisocyanate compounds is normally not more than 50% by weight, in particular, not more than 30% by weight, based on their combined weight with those unblocked polyisocyanate compounds.

Composition I of the Present Invention

Composition I according to the present invention comprises the above-described component (A) hydroxyl-containing compound and component (B) polyisocyanate compound.

Generally preferred blend ratio of the component (A) to component (B) in Composition I ranges, as converted to molar ratio of NCO/OH, 0.5/1–2/1, in particular, 0.7/1–1.5/1, inter alia, 0.8/1–1.2/1.

Composition I can be prepared by blending the component (A) and component (B) at a ratio within the above-specified range with an organic solvent and uniformly mixing the system.

The composition may further contain besides the components (A) and (B), at least a member selected from the group consisting of curing catalyst (F) and rheology-controlling agent (G).

Component (F):

With the view to promote the crosslinking reaction in coating film of Composition I comprising said components (A) and (B), the composition may contain, if necessary, curing catalyst (F).

Specific examples of useful curing catalyst (F) include organotin compounds such as tin caprylate, dibutyltin di(2-ethylhexanoate), dioctyltin di(2-ethylhexanoate), dioctyltin diacetate, dibutyltin dilaurate, dibutyltin oxide, monobutyltin trioctate, lead 2-ethylhexanoic acid and zinc caprylate. It is also possible to use such acids as paratoluenesulfonic acid, dodecylbenzenesulfonic acid, dinonylnaphthalenesulfonic acid, dinonylnaphthalenedisulfonic acid, butylphosphoric acid and octylphosphoric acid; and amine-neutralized products of those acids.

The use rate of the curing catalyst (F) is not subject to strict limitation but is variable depending on, for example, the purpose of using Composition I of the invention. Generally speaking, however, suitable use rate ranges 0.005–5 parts by weight, in particular, 0.01–3 parts by weight, per 100 parts (as solid) of total weight of the components (A) and (B).

Component (G):

Composition I may also contain if necessary a rheology-controlling agent (G) which imparts thixotropic property to the composition. Use of a rheology-controlling agent enables, in occasions of the composition being subjected to high shear stress, e.g., in occasions of spray-coating, to sufficiently reduce viscosity to allow easy spray-coating operation; and under low shear stress exerted after being coated on object surfaces, to raise the apparent viscosity. In consequence, when Composition I is applied onto perpendicular object surfaces or during the subsequent baking following the application, occurrence of coating defects such as dripping, cissing and the like can be prevented and favorable coating finish can be achieved.

As the rheology-controlling agent achieving such effects, fine particles of crosslinked polymers, polyurea compounds and the like can be used.

Useful fine particles of crosslinked polymers are those of internally crosslinked, particulate polymers which are difficultly soluble or entirely insoluble in above components (A) and (B) and organic solvent and the like, and are stably dispersible in Composition I.

Specific examples of such fine, crosslinked polymer particles include fine particulate intramolecularly crosslinked polymers which are obtained by aqueous emulsion or suspension polymerization methods or non-aqueous dispersion polymerization method and which are known per se. Of those, fine particulate polymers having intramolecularly crosslinked structure, which are obtained by aqueous emulsion or suspension polymerization methods can be isolated in solid form, by such physical or chemical means as evaporation or azeotropic distillation of water, or precipitation or agglomeration of the polymer (particles). It is also possible to directly replace a medium of the intended fine, crosslinked polymer particles from water to other resin, organic solvent and the like, in the occasion of applying such physical or chemical means.

As the fine, crosslinked polymer particles, those obtained by emulsion polymerization of a polymerizable monomer having at least two radical-polymerizable unsaturated groups in its molecule and other radical-polymerizable, unsaturated monomer(s) in the presence of a reactive emulsifying agent containing allyl group(s) in its molecule as disclosed in U.S. Pat. No. 5,348,998, can be conveniently used. In that case, the polymeric fine particles are internally crosslinked by the polymerizable monomer having in its molecule at least two radical-polymerizable unsaturated groups.

Again as the fine crosslinked polymer particles, a dispersion of fine, gelated polymer particles may be used, which is obtained by copolymerization and crosslinking reaction of a vinyl monomeric mixture containing at least 0.5 weight % of at least two vinyl polymers having respectively complementary functional groups which are mutually reactable and bondable, in the presence of a mixture of macromonomer (a) having poly(12-hydroxystearic acid) molecular chain and on average at least about one polymerizable, unsaturated double bond per molecule with macromonomer (b) which is a copolymer of ethylenically unsaturated monomers, has a solubility parameter (SP value) of 7.5–9.2 and has, on average, about 1 to about 1.5 polymerizable, unsaturated double bonds per molecule, in an organic solvent which dissolves said macromonomers (a) and (b) and vinyl monomers but does not substantially dissolve polymers of said vinyl monomers. Such fine, crosslinked polymer particles are known per se, as having been disclosed in U.S. Pat. No. 5,077,347 in detail. As the macromonomer (a), those having about 1 to about 10 polymerizable, unsaturated double bonds per molecule are preferred, which are obtained through the procedures of adding an epoxy-containing polymerizable unsaturated compound to an end carboxyl group of poly(12-hydroxystearic acid); graft-copolymerizing or block-copolymerizing the resulting polymerizable unsaturated group-containing reaction product with a polymerizable unsaturated monomeric mixture comprising an epoxy-containing polymerizable monomer; and adding to the resulting suspended epoxy-containing copolymer a polymerizable unsaturated carboxylic acid. In particular, among such macromonomer (a), those having one polymerizable unsaturated double bond per molecule, which are formed by adding an epoxy-containing polymerizable unsaturated compound to end carboxyl group of poly(12-hydroxystearic acid) are preferred. As macromonomer (b), those having number-average molecular weight ranging 3,000–20,000 and hydroxyl value ranging 45–150 are preferred. As combination of said complimentary functional groups, for example, epoxy group/carboxyl group, alkoxysilyl group/hydroxyl group, epoxy group/phosphate group and isocyanate group/hydroxyl group may be named.

These fine crosslinked polymer particles have high crosslinkage density and are substantially non-swelling and non-fusible even in organic solvent of high polymer-dissolving ability such as toluene or ethyl acetate. Furthermore, when added to Composition I of the present invention, which contains an organic solvent, they scarcely raise viscosity of Composition I and enable to provide a solution (dispersion) of high resin content, i.e., high solid composition. Such Composition I which is blended with fine, crosslinked polymer particles provides cured coating film formed by both of said fine particles and the binder resin. Generally suitable average particle size of the fine, crosslinked polymer particles is within a range of about 0.01–about 2 $\mu$m, in particular, 0.05–0.5 µm. When the particle size falls within the above range, paint compositions excelling in dripping-prevention effect and finished appearance of the coating film are obtained.

As said rheology-controlling agent (G), furthermore, a solid, particulate polyurea compound formed of a reaction product of isocyanurate trimer obtained from $C_3$–$C_{20}$ diisocyanate compound with an amine compound having at least one primary amino group may be used U.S. Pat. No. 4,677,028. Said isocyanurate trimer is preferably formed from $C_3$–$C_{20}$, in particular, $C_5$–$C_{20}$ inter alia $C_8$–$C_{12}$ diisocyanates. among which hexanmethylene diisocyanate is the most advantageous Examples of preferred diisocyanate include methylene diisocyanate, trimethylene diisocyanate, tetramethylene diisocyanate, hexamethylene diisocyanate, ω,ω' dipropylether diisocyanate, thiodipropyl diisocyanate, cyclohexyl-1,4-diisocyanate, dicyclohexylmethane-4,4'-diisocyanate, 1,5-dimethyl-2,4-bis(isocyanatomethyl)-benzene, 1,5-dimethyl-2,4-bis((ω-isocyanatoethyl)-benzene, 1,3,5-trimethyl-2,4-bis(isocyanatomethyl)-benzene, 1,3,5-triethyl-2,4-bis(isocyanatomethyl)-benzene, heterocyclic diisocyanate commercially available under the tradename of Desmodur TT (Bayer AG), dicyclohexyldimethylmethane-4,4'-diisocyanate, 2,4-toluene diisocyanate, 2,6-toluene diisocyanate and diphenylmethane-4,4'-diisocyanate. Of those, hexamethylene diisocyanate is the most advantageous. If desired, heterocyclic trimers of two or three different kinds of diisocyanate may be used, or mixtures of above-named heterocyclic triisocyanates may also be used.

Examples of preferred primary amine, which is the second component for making said polyurea compound, include benzylamine, ethylamine, n-propylamine, sec-propylamine, n-butylamine, sec-butylamine, tert-butylamine, n-pentylamine, α-methylbutylamine, α-ethylpropylamine, β-ethylbutylamine, hexylamine, octylamine, decylamine, stearylamine, cyclohexylamine, aniline and hexamethylene-diamine. These primary amines can generally contain not more than 55, preferably 1–24, inter alia, 1–12, carbon atoms. Amines containing at least one primary amino group and at least one ether and/or hydroxyl group may also be used, examples of which include ethanolamine, 6-aminohexanol, p-methoxybenzylamine, methoxypropylamine, 3,4-dimethoxyphenylethylamine, 2,5-dimethoxyaniline, furfurylamine, tetrahydrofurfurylamine and bis(3-aminopropyl)polytetrahydrofuran (one having a molecular weight of approximately 750). Mixtures of these amines may also be used.

In the reaction of heterocyclic triisocyanate with primary amine for making the polyurea compound, generally either of the heterocyclic triisocyanate or primary amine can be used in stoichiometrically excessive amount. For example, the ratio of the amino group number in the primary amine to the heterocyclic triisocyanate group number may range from 0.7 to 1.5, preferably from 0.9 to 1.1.

Generally the reaction of heterocyclic triisocyanate with primary amine is preferably conducted, after mixing the reactants, at temperatures ranging 10°–150° C., in particular, 20°–80° C. While the mixing of the reacting components can generally be done by any optional means, it is desirable to add the heterocyclic triisocyanate to the primary amine. If necessary, the addition can be dividedly effected in plural stages. Generally this reaction is performed in a solvent, for example, an aliphatic hydrocarbon such as acetone, methyl isobutyl ketone, 1-methoxy-propanol-2, benzene, toluene, xylene or petroleum ether.

The blend ratio of rheology-controlling agent (G) is not strictly limited, but is variable depending on individual purpose of using Composition I. Generally suitable use ratio ranges from 1–20, in particular, 2–10, parts by weight, per 100 parts by weight (as solid) of the sum of components (A) and (B).

Composition I of the present invention may further contain, in addition to the above-described components (A) and (B) and optionally (F) and/or (G), solid color pigment, metallic pigment, iridescent pigment, extender pigment, ultraviolet absorber, photo-stabilizer, sedimentation-preventing agent, surface regulating agent and other additives to paint. These component or components can be homogeneously mixed into the organic solvent to provide Composition I of the present invention.

Examples of useful solid color pigment include quinacridone-, azo- or phthalocyanine-derived organic pigments such as Quinacridone Red; Pigment Red; Phthalocyanine Blue, Phthalocyanine Green and Perylene Red; and inorganic pigments such as titanium dioxide and carbon black. Examples of metallic pigment include aluminium powder, vapor-deposited aluminium powder, alumina powder, nickel powder, copper powder, brass powder and chromium powder. Examples of iridescent pigment include nacreous pearl mica powder and nacreous colored pearl mica powder.

Composition I of the present invention is useful as organic solvent-based high solid paint composition. Examples of organic solvent useful in that occasion include various organic solvents for paints, such as aromatic or aliphatic hydrocarbon solvents, alcoholic solvents, ester solvents, ketone solvents and ether solvents.

Composition II of the Present Invention

Composition II which is offered according to the invention is a paint composition comprising, in addition to the above-described hydroxyl-containing compound (A) and polyisocyanate compound (B), (C) melamine resin.

Component (C):

In Composition II of the invention, melamine resin (C) serves as a crosslinking agent, concurrently with said polyisocyanate compound (B), to participate in the crosslinking reaction with said hydroxyl-containing compound (A).

As the suitable melamine resin (C) to be used in Composition II, methylolated melamine resins which are obtained by reacting with aldehyde, a part or all of the amino groups (—$NH_2$) in melamine molecules (including those containing imino groups >NH in their molecules). As the aldehyde, formaldehyde, paraformaldehyde, acetaldehyde, benzaldehyde and the like can be used. Also alkyl-etherified melamine resins in which a part or all of the methylol groups in said methylolated melamine resins (including those containing imino groups >NH in their molecules) can be used as the melamine resin (C).

Examples of the alcohol useful for the alkyletherification include $C_1$–$C_{10}$ monohydric alcohols such as methyl alcohol, ethyl alcohol, n-propyl alcohol, i-propyl alcohol, n-butyl alcohol, i-butyl alcohol, 2-ethylbutanol and 2-ethylhexanol.

The melamine resin (C) generally desirably has a number-average molecular weight of 150–3,000, in particular, 200 to 2,000. Use of such melamine resin (C) containing imino groups is preferred for improving weatherability of the coating film, in particular, gloss retention.

Blend ratios among the three components (A), (B) and (C) in Composition II are not critical but are variable over a wide range depending on individual purpose of using Composition II. Whereas, generally suitable ratios are within the following ranges, based on the total solid content of the three components (A), (B) and (C), percentages being by weight:

Component (A): 10–60%, preferably 20–45%, inter alia, 20–35%

Component (B): 30–70%, preferably 35–60%, inter alia, 40–55%

Component (C): 3–40%, preferably 5–30%, inter alia, 5–10%.

Composition II may also contain, if necessary, the earlier described curing catalyst (F) and/or rheology-controlling agent (G), as in the case of Composition I. Their suitable use rates are, per 100 parts by weight of the total solid content of the components (A), (B) and (C), in general 0.005–5, in particular, 0.01–3 parts by weight, of the curing catalyst (F) and 1–20, in particular, 2–10 parts by weight of the rheology-controlling agent (G).

Composition II furthermore may contain, similarly to Composition I, solid color pigment, metallic pigment, iridescent pigment, extender pigment, ultraviolet absorber, photostabilizer, sedimentation-preventing agent, surface regulating agent, and other additives to paint.

Composition III of the Present Invention

Composition III which is offered by the present invention is a paint composition comprising, in addition to the above-described hydroxyl-containing compound (A), polyisocyanate compound (B) and melamine resin (C), (D) a hydroxyl-containing resin having a weight-average molecular weight of 500–6,000 and a hydroxyl value of 50–600 mgKOH/g.

Component (D)):

The hydroxyl-containing resin (D) to be contained in Composition III of the invention constitutes, together with the relatively low molecular weight hydroxyl-containing compound (A), the base resin component of Composition III. As the component (D), hydroxyl-containing polyester resins and hydroxyl-containing acrylic resins having weight-average molecular weight ranging 500–6,000 and hydroxyl value of 50–600 mgKOH/g are conveniently used. Among the component (D), those relatively low molecular weight, hydroxyl-containing resins having weight-average molecular weight of 500–1,000 and hydroxyl value of 200–600 mgKOH/g fall also within the definition of the component (A), which are useful as both components (A) and (D) in common.

Said hydroxyl-containing polyester resins can be prepared by esterification reaction of carboxyl groups in polybasic acid with hydroxyl groups in polyhydric alcohol. Polybasic acid is a compound containing at least two carboxyl groups per molecule, examples of which including phthalic, isophthalic, terephthalic, succinic, adipic, azelaic, sebacic, tetrahydrophthalic, hexahydrophthalic, HET, maleic, fumaric, itaconic, trimellitic and pyromellitic acids and their anhydrides. Polyhydric alcohol is a compound having at least two hydroxyl groups per molecule, examples of which including α-glycols such as ethylene glycol, 1,2-propylene glycol, 1,2-butylene glycol, 2,3-butylene glycol, 1,2-hexanediol, 1,2-dihydroxycyclohexane, 3-ethoxypropane-1, 2-diol and 3-phenoxypropane-1,2-diol; neopentyl glycol, 2-methyl-1,3-propanediol, 2-methyl-2,4-pentanediol, 3-methyl-1,3-butanediol, 2-ethyl-1,3-hexanediol, 2,2-diethyl-1,3-propanediol, 2,2,4-trimethyl-1,3-pentanediol, 2-butyl-2-ethyl-1,3-propanediol, 2-phenoxypropane-1,3-diol, 2-methyl-2-phenylpropane-1,3-diol, 1,3-propylene glycol, 1,3-butylene glycol, 2-ethyl-1,3-octanediol, 1,3-dihydroxycyclohexane, 1,4-butanediol, 1,4-dihydroxycyclohexane, 1,5-pentanediol, 1,6-hexanediol, 2,5-hexanediol, 3-methyl-1,5-pentanediol, 1,4-dimethylolcyclohexane, tricyclodecanedimethanol, 2,2-dimethyl-3-hydroxypropyl-2,2-dimethyl-3-hydroxypropyonate (an esterification product of hydroxypivalic acid with neopentyl glycol), bisphenol A, bisphenol F, bis(4-hydroxyhexyl)-2,2-propane, bis(4-hydroxyhexyl) methane, 3,9-bis(1,1-dimethyl-2-hydroxyethyl)-2,4,8,10-tetroxaspiro [5,5]-undecane, di-ethylene glycol, triethylene glycol, glycerine, diglycerine, triglycerine, pentaerythritol, dipentaerythritol, sorbitol, mannitol, trimethylol-ethane, trimethylolpropane, ditrimethylolpropane and tris(2-hydroxyethyl)isocyanurate.

Introduction of hydroxyl groups into the polyester resin can be effected by using as the polyhydric alcohol component polyhydric alcohol containing at least 3 hydroxyl groups per molecule, in addition to those polyhydric alcohols containing two hydroxyl groups per molecule.

Hydroxyl-containing acrylic resins can be prepared, for example, by copolymerizing a polymerizable monomeric component comprising hydroxyl-containing polymerizable monomer(s) and acrylic monomer(s).

Hydroxyl-containing polymerizable monomer is a compound containing at least one each of hydroxyl group and polymerizable unsaturated bond per molecule, examples of which including monoesterified products of $C_2$–$C_{20}$ glycols with (meth)acrylic acid such as hydroxyethyl (meth) acrylate, hydroxypropyl (meth)acrylate and hydroxybutyl (meth)acrylate. Examples of said acrylic monomer include monoesterified products of (meth)acrylic acid with $C_1$–$C_{22}$ monohydric alcohols, such as methyl acrylate, methyl methacrylate, ethyl acrylate, ethyl methacrylate, propyl acrylate, propyl methacrylate, butyl acrylate, butyl methacrylate, hexyl acrylate, hexyl methacrylate, octyl acrylate, octyl methacrylate, lauryl acrylate, lauryl methacrylate, 2-ethylhexyl acrylate, 2-ethylhexyl methacrylate, cyclohexyl (meth)acrylate and isobornyl (meth)acrylate.

In the occasion of preparing the hydroxyl-containing acrylic resin, polymerizable monomer(s) other than these hydroxyl-containing polymerizable monomers and acrylic monomers may be concurrently used.

Examples of such other monomers include $C_2$–$C_{18}$ alkoxy-alkyl esters of (meth)acrylic acid, such as methoxybutyl acrylate, methoxybutyl methacrylate, methoxyethyl acrylate and methoxyethyl methacrylate; aminoacrylic monomers such as N,N-dimethylaminoethyl acrylate, N,N-dimethylaminoethyl methacrylate, N,N-diethylaminoethyl acrylate, N,N-diethylaminoethyl methacrylate, N-t-butylaminoethyl acrylate, N-t-butylaminoethyl methacrylate, N,N-dimethylaminopropyl acrylate and N,N-dimethylaminopropyl methacrylate;acrylamide monomers such as acrylamide, methacrylamide, N-methylacrylamide, N-methylmethacrylamide, N-ethylacrylamide, N-ethylmethacrylamide, N-butylacrylamide, N-butylmethacrylamide, N,N-dimethylacrylamide and N,N-dimethylmethacrylamide; glycidyl-containing monomers such as glycidyl acrylate and glycidyl methacrylate; carboxyl-containing polymerizable monomers such as acrylic acid, methacrylic acid, maleic acid, itaconic acid, fumaric acid, mesaconic acid and anhydrides and half-esterified products of these acids; styrene, α-methylstyrene, vinyltoluene, acrylonitrile, vinyl acetate, "Veova™ 9, "Veova™ 10" (Shell Oil Company), and vinyl chloride.

Hydroxyl-containing modified oligomers formed by ring-opening esterification reaction of polyhydric alcohols having at least two hydroxyl groups per molecule with lactones are also useful as the hydroxyl-containing resin. Commercially available products of such hydroxyl-containing modified oligomers are, for example, "TONE™ 0200 Polyol", "TONE™ 0301 Polyol", "TONE™ 0305 Polyol" (Union Carbide Corporation) and "Placcel™ 205", "Placcel™ 303" and "Placcel™ 305" (Daicel Chemical Industries, Ltd.).

Those hydroxyl-containing polyester resins and hydroxyl-containing acrylic resins servable as the hydroxyl-containing resin (D) have weight-average molecular weight within a range of 500–6,000, preferably 1,000–5,200, inter alia, 1,500–4,000, and hydroxyl value of within a range 50–600 mgKOH/g, preferably 70–450 mgKOH/g, inter alia, 80–200 mgKOH/g. The resin (D) furthermore preferably has an acid value generally not higher than 15 mgKOH/g, in particular, that within a range of 4–10 mgKOH/g.

Blend ratios among the four components (A), (B), (C) and (D) in Composition III are not critical but are variable over a wide range depending on individual purpose of using Composition III. Whereas, generally suitable ratios are within the following ranges, based on the total solid content of the four components (A), (B), (C) and (D), percentages being by weight:

Component (A): 5–50%, preferably 10–40%, inter alia, 15–35%

Component (B): 30–70%, preferably 40–60%, inter alia, 45–55%

Component (C): 3–30%, preferably 7–25%, inter alia, 7–20%,

Component (D): 5–50%, preferably 10–40%, inter alia, 10–25%.

Composition III may also contain, if necessary, the earlier described curing catalyst (F) and/or rheology-controlling agent (G), as in the case of Composition I. Their suitable use rates are, per 100 parts by weight of the total solid content of the components (A), (B), (C) and (D), in general 0.005–5, in particular, 0.01–3 parts by weight of the curing catalyst (F) and 1–20, in particular, 2–10 parts by weight of the rheology-controlling agent (G).

Composition III furthermore may contain, similarly to Composition I, solid color pigment, metallic pigment, iridescent pigment, extender pigment, ultraviolet absorber, photostabilizer, sedimentation-preventing agent, coated surface regulating agent, and other additives to paint.

Composition IV of the Present Invention

Composition IV which is offered by the present invention is a paint composition comprising, in addition to the above-described hydroxyl-containing compound (A), polyisocyanate compound (B), melamine resin (C) and hydroxyl-containing resin (D).

(E) an alkoxysilyl-containing compound.

Component (E):

The alkoxysilyl-containing compound to be contained in Composition IV of the invention is a compound containing at least one alkoxysilyl group per molecule. Here said alkoxysilyl group is the one having 1–3 alkoxy groups directly bonding with single silicon atom (Si), and an alkoxysilyl group having three alkoxy groups may have still another alkoxy group bonded to the remaining valency bond.

Examples of the alkoxysilyl-containing compound to be used as the component (E) in Composition IV of the invention include:

(1) unfunctional alkoxysilane compounds such as di-methoxydimethylsilane, dimethoxydiethylsilane, dimethoxydiphenylsilane, diethoxydimethylsilane, trimethoxymethylsilane, trimethoxyethylsilane, trimethoxypropylsilane, trimethoxyphenylsilane, tetramethoxysilane, tetraethoxysilane, tetrabutoxysilane and dimethoxydiethoxysilane;

(2) silane-coupling agents such as γ-isocyanatopropyltrimethoxysilane, γ-isocyanatopropylmethyldimethoxysilane, β-(3,4-epoxycyclohexyl)ethyltrimethoxysilane, γ-glycidoxypropyltrimethoxysilane, γ-glycidoxypropylmethyldiethoxysilane and γ-aminopropyltriethoxysilane;

(3) polymerizable unsaturated group-containing alkoxysilane compounds such as vinyltrimethoxysilane, vinyltriethoxysilane, vinylmethyldimethoxysilane, vinylmethyldiethoxysilane, γ-(meth)-acryloyloxypropyltrimethoxysilane, γ-(meth)acryloyloxypropylmethyldimethoxysilane, γ-(meth)acryloyloxypropylmethyldiethoxysilane, γ-(meth)acryloyloxypropyltriethoxysilane, β-(meth)acryloyloxyethyltrimethoxysilane and γ-(meth)acryloyloxybutylphenyldimethoxysilane;

(4) siloxane bond-containing alkoxysilane compounds obtained by partial condensation of at least one alkoxysilyl-containing compound selected from above (1) unfunctional alkoxysilane compounds, (2) silane-coupling agents and (3) polymerizable unsaturated group-containing alkoxysilane compounds;

(5) acrylic, polyester, alkyd and urethane resins which are modified with at least one alkoxysilyl-containing compound selected from above compounds of the groups (1)–(4); and (6) polymers which are obtained by (co)polymerizing at least one of above group (3) polymerizable unsaturated group-containing alkoxysilane compound with, if necessary, other polymerizable unsaturated monomer(s).

Of those alkoxysilyl group-containing compounds, those preferred as the component (E) are the above group (6) polymers.

The alkoxysilyl-containing compounds (E) to be used in Composition IV of the invention generally have weight-average molecular weight ranging 150–50,000, preferably 200–20,000, inter alia, 500–10,000.

Blend ratios among the five components (A), (B), (C), (D) and (E) in Composition IV are not critical but are variable over a wide range depending on individual purpose of using Composition IV. Whereas, generally suitable ratios are within the following ranges, based on the total solid content of the five components (A), (B), (C), (D) and (E), percentages being by weight:

Component (A): 5–50%, preferably 10–40%, inter alia, 15–35%

Component (B): 30–70%, preferably 40–60%, inter alia, 45–55%

Component (C): 3–30%, preferably 7–25%, inter alia, 7–20%

Component (D): 5–50%, preferably 10–40%, inter alia 10–25%

Component (E): 1–30%, preferably 1.5–20%, inter alia, 3–15%.

Composition IV may also contain, if necessary, the earlier described curing catalyst (F) and/or rheology-controlling agent (G), as in the case of Composition I. Their suitable use rates are, per 100 parts by weight of the total solid content of the five components (A), (B), (C), (D) and (E), in general 0.005–5, in particular, 0.01–3 parts by weight of the curing catalyst (F) and 1–20, in particular, 2–10 parts by weight of the rheology-controlling agent (G).

Composition IV furthermore may contain, similarly to Composition I, solid color pigment, metallic pigment, iridescent pigment, extender pigment, ultraviolet absorber, photostabilizer, sedimentation-preventing agent, coated surface regulating agent, and other additives to paint.

Above-described paint compositions according to the invention (Compositions I–IV) can have high solid concentration. As organic solvent-based high solid paint compositions, they can be applied at the coating time, at solid concentration not lower than 70% by weight, preferably within a range of 75–90% by weight.

Because the polyisocyanate compound (B) in those paint compositions of the invention reacts with components having active hydrogen, such as the component (A), component (D) and the like, at room temperature with relative ease, the paint compositions are preferably used in "two-liquid system" as normally referred to. That is, it is preferred to keep the component (B) separated from the other components (A), (B), (C), (D) and (E). The respective components of the groups constituting the two-liquid system can be mixed immediately before use as the paint composition. Those components other than (A)–(E), such as the components (F) and (G) may be blended to either of the components (A), (C)–(E) side or the component (B) side, considering reactivity of component (B) in individual case; or may be separately kept as the third group component.

As the paint compositions of the invention have adequate viscosity suitable for coating application even at solid concentration of 70 weight % or higher, they can be easily applied by such methods as airless spraying, air spraying, rotary atomizing and the like. The coating operation may be carried out by electrostatic impressing. The compositions of the present invention excel in atomizing property when applied by these coating methods, to form coating film excelling in leveling property, distinctness-of-image-gloss and fatness appearance.

It is also possible to apply those compositions of the invention after advance heating to, for example, 30–80° C., preferably 40–60° C. As means of the heating, such methods as separately heating a composition (i) containing the component (A) and the other composition (ii) containing the component (B) and mixing the two compositions; heating the composition (i) only and mixing it with the composition (ii); heating the composition (ii) only and mixing it with the composition (i); or mixing the two compositions (i) and (ii) and then heating the mixture; may be used. While the heating may further shorten pot life of those paint compositions of the invention, it is possible to avoid this question of short pot life by homogeneously mixing the two compositions, after heating, with a two-liquid mixing apparatus (e.g., Precision Mix™, GRACO Co.). For example, charge the liquid A tank of said apparatus with the composition (i), and the liquid B tank, with the composition (ii) and heat the liquid A tank to 55° C. In the occasion, the liquid B tank may be left at room temperature. Then mix the compositions (i) and (ii) with said two-liquid mixing apparatus to obtain their mixture having an elevated temperature of 40° C. In such procedure, it may be the composition (ii) that is heated and the composition (i), left at room temperature. Heating in that manner enables to lower viscosity of those paint compositions according to the present invention and in consequence, to further improve application property of the compositions as high solid paints.

The paint compositions according to the present invention are useful as clear paints; and also as solid color paints, metallic paints or iridescent paints, blended with coloring pigments, metallic paints or iridescent paints. In particular, because the compositions are capable of forming cured coating film excelling in acid resistance, mar resistance and finished appearance (e.g., gloss, fatness and distinctness-of-image-gloss), etc., they are suitable for use as the top layer clear paints in a process for forming a multi-layered coating film, by sequentially applying at least one coloring paint and at least one clear paint.

According to the present invention, therefore, a process for forming multi-layered coating film is provided, which coating film comprising at least one colored layer and at least one transparent layer, the process being characterized by forming the top coating layer using a paint composition of the present invention, i.e., any one of the high solid paint compositions I to IV of the invention.

In an occasion of forming a multi-layered coating film by the process of the invention, examples of methods of using one of the paint compositions of the invention as the top layer clear paint include the following:

Method (a): in a 2-coat system for sequentially applying a coloring paint and a clear paint, a method of using a paint composition of the present invention as the clear paint, Method (b): in a 3-coat system for sequentially applying a coloring paint, first clear paint and second clear paint, a method of using a paint composition of the present invention as the second clear paint, or Method (c): in a 3-coat system for sequentially applying a first coloring paint, second coloring paint and a clear paint, a method of using a paint composition of the present invention as the clear paint.

Those methods (a), (b) and (c) are explained in further detail in the following.

Coloring paints useful in the above method (a) include solid color, metallic and iridescent paints.

In said coloring paints, their resin component is composed of at least one base resin component such as acrylic resin, vinyl resin polyester resin, alkyd resin, urethane resin and the like which have crosslinkable functional groups (such as hydroxyl, epoxy carboxyl, alkoxysilyl and the like); and at least one crosslinking agent component for crosslinking and curing said base resin or resins, such as alkyletherified melamine resin, urea resin, guanamine resin, optionally blocked polyisocyanate compound, epoxy compound, carboxyl-containing compound and the like. Based on the combined weight of said two components, their preferred ratios are: 50–90%, in particular, 60–80% of the base resin component to 50–10%, in particular, 40–20% of the crosslinking agent component. Into the coloring paints, those earlier named examples of the pigments blendable with the paint compositions of the present paint compositions, such as coloring pigment, metallic pigment, iridescent pigment and the like, are blended. These pigments can be used either singly or in combination of two or more. The coloring paints may be either organic solvent-based or water-based.

The method (a) can be practiced in 2-coat-1-bake (2C1B) system or 2-coat-2-bake (2C2B) system, which comprise: applying above-described coloring paint onto metallic or plastic substrate for, e.g., automobile bodies, either directly or after applying a primer such as a cationic electropaint and if necessary a surfacer and curing them, by such means as airless spraying, air spraying or rotary atomizing application (which may be electrostatically impressed), to a cured film thickness of about 10–about 50 $\mu$m; heating the formed coloring paint film at about 100°–about 180° C., preferably at about 120°–about 160° C., for about 10–about 40 minutes to cure the film, or allowing the film to stand at room temperature or preheating it for several minutes, without effecting the curing; thereafter applying a clear paint comprising a paint composition of the present invention by a similar coating method to a cured film thickness of about 10–about 70 $\mu$m; and heating the film at about 100°–about 180° C., preferably about 120°–about 160° C., for about 10–about 40 minutes to bring about crosslinkage and curing.

In the method (b), those coloring paints similar to those which are explained in respect of the method (a) are useful.

The first clear paint is one for forming a transparent coating film, which may be any of the earlier described coloring paints from which nearly all or all of pigments therein have been removed. (The clear paint may be a paint composition of the present invention.) As the second clear paint, a clear paint formed of a paint composition of the present invention is used. The method (b) can be practiced by 3-coat-1-bake (3C1B), 3-coat-2-bake (3C2B) or 3-coat-3-bake (3C3B) systems, which comprise procedures similar to those of the method (a), i.e., applying coloring paint and curing, or leaving the coated coloring film at room temperature or preheating it for several minutes without curing; applying a first clear paint onto the coated coloring film by application means similar to those used in the method (a), to a cured film thickness of from about 10 to about 50 μm; heating and curing the same at about 100°–about 180° C., preferably about 120°–about 160° C., for about 10–about 40 minutes, or leaving the film at room temperature or preheating it for several minutes without curing; then applying a second clear paint formed of a paint composition of the present invention by similar application means to a cured film thickness of from about 10 to about 50 μm; and heating and curing the film at about 100–about 180° C., preferably at about 120–about 160° C., for about 10–about 40 minutes.

In the method (c), as the first coloring paint, any of those explained as to the method (a) can be used. As the second coloring paint which is to be applied onto the first coloring film surface, coloring transparent paint having a minor hiding power of the extent allowing perception of color tone of the first coloring paint (solid color, metallic color or iridescent color) through the film of said second coloring paint is used. Accordingly, hiding power of the second coated coloring film is normally less than that of the first coated coloring film. Onto the second coated coloring film, a clear paint is applied, which is a transparent film-forming paint and for which a paint composition of the present invention is used. The method (c) can be practiced by 3-coat-1-bake (3C1B), 3-coat-2-bake (3C2B) or 3-coat-3-bake (3C3B) systems, which comprise procedures similar to those of the method (a), i.e., applying a first coloring paint and curing, or leaving the coated coloring film at room temperature or preheating it for several minuets without curing; applying a second coloring paint onto the first coated coloring film to a cured film thickness of from about 10 to about 50 μm; heating and curing the same at about 100°–about 180° C., preferably about 120°–about 160° C., for about 10–about 40 minutes, or leaving the film at room temperature or preheating it for several minutes without curing; then applying a clear paint formed of a paint composition of the present invention by application means similar to those used in the method (a), to a cured film thickness of from about 10 to about 50 μm; and heating and curing the same film at about 100°–about 180° C., preferably at about 120°–about 160° C., for about 10–40 minutes.

As above-described, the invention provides high solid paint compositions in which organic solvent content is reduced to raise concentration of the solid component, to contribute to environmental preservation and saving resources. Use of the paint compositions according to the invention enables formation of coating film with popping (foaming)-free surface, exhibiting preventive effect against etching or soil stains caused by acid precipitation and furthermore seldom developing scratches with car-washing machines or the like.

Therefore, the paint compositions of the present invention are particularly useful as paints for top coating of automobile bodies.

Hereinafter the invention is explained in further details, referring to working examples and comparative examples, in which parts and percentages are by weight unless otherwise specified, and the coating film thickness refers to that of cured film.

1. Preparation of Samples
1) Component (A)
(A-1):
A reactor equipped with a stirrer, cooler, thermostat, nitrogen-inlet pipe and a dropping funnel was charged with 296 parts of dimethylolbutanoic acid. After replacing the atmosphere inside the reactor with nitrogen, the content of the reactor was heated to 120° C. and into which 490 parts of Cardura™ E10 was dropwisely added, consuming 2 hours. Maintaining the temperature at 120° C., the reaction was continued until the acid value of the reaction product became no higher than 9. Thus obtained component (A-1) had a solid content of about 98%, Gardner viscosity (20° C.) of Z6–Z7, hydroxyl value of 428 mgKOH/g, number-average molecular weight of 600 and a weight-average molecular weight of 610.

(A-2):
A reactor equipped with a stirrer, cooler, thermostat, nitrogen-inlet pipe and a dropping funnel was charged with 268 parts of dimethylolpropionic acid. After replacing the atmosphere inside the reactor with nitrogen, the content of the reactor was heated to 150° C. and into which 490 parts of Cardura™ E10 was dropwisely added, consuming 1 hour. Dropping the temperature to 120° C., the reaction was continued at said temperature until the acid value of the reaction product became no higher than 9. Thus obtained component (A-2) had a solid content of about 97%, Gardner viscosity (20° C.) of Z6, hydroxyl value of 444 mgKOH/g, number-average molecular weight of 590 and a weight-average molecular weight of 660.

(A-3):
A reactor equipped with a stirrer, cooler, thermostat, nitrogen-inlet pipe and a dropping funnel was charged with 273 parts of trimethylolpropane. After replacing the atmosphere inside the reactor with nitrogen, the content of the reactor was heated to 100° C., and into which 308 parts of tetrahydrophthalic anhydride was added, care being taken to avoid excessive heat generation, followed by 3 hours' standing at 100° C. Then 490 parts of Cardura™ E10 was added, and the system was maintained at 120° C. When the acid value dropped to not higher than 9, the reaction was terminated. Thus obtained component (A-3) had a solid content of about 96%, Gardner viscosity (20° C.) of Z9, hydroxyl value of 314 mgKOH/g, number-average molecular weight of 720 and a weight-average molecular weight of 820.

(A-4):
A reactor equipped with a stirrer, cooler, thermostat, nitrogen-inlet pipe and a dropping funnel was charged with 292 parts of adipic acid. After replacing the atmosphere inside the reactor with nitrogen, the content of the reactor was heated to 150° C. and into which 490 parts of Cardura™ E10 was dropwisely added, consuming 2 hours. Maintaining the temperature at 120° C., the reaction was continued until the acid value of the reaction product became no higher than 9. Thus obtained component (A-4) had a solid content of about 98%, Gardner viscosity (20° C.) of Z6, hydroxyl value of 176 mgKOH/g, number-average molecular weight of 800 and a weight-average molecular weight of 910 (control).

(A-5):
A reactor equipped with a stirrer, cooler, thermostat, nitrogen-inlet pipe and a dropping funnel was charged with 616 parts of ethyl-3-ethoxypropionate. After replacing the atmosphere inside the reactor with nitrogen, the content of the reactor was heated to 156° C. and into which a mixture of 500 parts of styrene, 120 parts of isobutyl methacrylate, 460 parts of 2-ethylhexyl acrylate, 900 parts of 2-hydroxyethyl methacrylate, 20 parts of acrylic acid and 300 parts of azobisisobutyronitrile was dropped, consuming 5 hours. After the dropping was completed, the system was aged for 30 minutes at 150° C., to provide an acrylic resin solution (A-5) having a solid content of about 69% and Gardner viscosity (20° C.) of Z3. The resultant acrylic resin (solid component) had a hydroxyl value of 210 mgKOH/g, acid value of 7.2 mgKOH/g, number-average molecular weight of 1700 and a weight-average molecular weight of 2560 (control).

(A-6):

NOTE™ 301 (Union Carbide Corporation, a ring-opening esterification product of polyhydric alcohol with lactones; hydroxyl value: about 561 mgKOH/g, weight-average molecular weight: about 700) (control).

2) Component (D)

(D-1):

A reactor equipped with a stirrer, cooler, thermostat, nitrogen-inlet pipe and a dropping funnel was charged with 616 parts of ethyl-3-ethoxypropionate, and its inside atmosphere was replaced with nitrogen, followed by heating to 150° C. Maintaining said temperature, a mixture composed of 220 parts of styrene, 880 parts of isobutyl methacrylate, 242 parts of butyl acrylate, 330 parts of 2-ethylhexyl acrylate, 418 parts of 2-hydroxyethyl methacrylate, 88 parts of 2-hydroxyethyl acrylate, 22 parts of acrylic acid and 220 parts of azobisisobutyronitrile was dropped into the system consuming 5 hours. After completion of the dropping, the system was aged at 150° C. for 30 minutes, to provide an acrylic resin solution (D-1) having a solid content of about 69% and a Gardner viscosity (20° C.) of PQ was obtained. The resulting acrylic resin (solid component) had a hydroxyl value of 100 mgKOH/g, acid value of 7.2 mgKOH/g, number-average molecular weight of 2050 and a weight-average molecular weight of 3070.

(D-2):

A reactor equipped with a stirrer, cooler, thermostat, nitrogen-inlet pipe and a dropping funnel was charged with 616 parts of ethyl-3-ethoxypropionate, and its inside atmosphere was replaced with nitrogen, followed by heating to 150° C. Maintaining said temperature, a mixture composed of 220 parts of styrene, 880 parts of isobutyl methacrylate, 330 parts of butyl acrylate, 330 parts of 2-ethylhexyl acrylate, 418 parts of 2-hydroxyethyl methacrylate, 22 parts of acrylic acid and 154 parts of azobisisobutyronitrile was dropped into the system consuming 5 hours. After completion of the dropping, the system was aged at 150° C. for 30 minutes, to provide an acrylic resin solution (D-2) having a solid content of 69% and a Gardner viscosity (20° C.) of T was obtained. The resulting acrylic resin (solid component) had a hydroxyl value of 82 mgKOH/g, acid value of 7.3 mgKOH/g, number-average molecular weight of 3220 and a weight-average molecular weight of 5160.

(D-3):

A reactor equipped with a stirrer, cooler, thermostat, nitrogen-inlet pipe and a dropping funnel was charged with 616 parts of ethyl-3-ethoxypropionate, and its inside atmosphere was replaced with nitrogen, followed by heating to 135° C. Maintaining said temperature, a mixture composed of 220 parts of styrene, 880 parts of isobutyl methacrylate, 330 parts of butyl acrylate, 330 parts of 2-ethylhexyl acrylate, 418 parts of 2-hydroxyethyl methacrylate, 22 parts of acrylic acid and 88 parts of azobisisobutyronitrile was dropped into the system consuming 4 hours. After completion of the dropping, the system was aged at 135° C. for an hour, to provide an acrylic resin solution (D-3) having a solid content of 70% and a Gardner viscosity (20° C.) of Z was obtained. The resulting acrylic resin (solid component) had a hydroxyl value of 82 mgKOH/g, acid value of 7.6 mgKOH/g, number-average molecular weight of 5270 and a weight-average molecular weight of 10800 (control).

3) Component (G)

(G-1):

A macromonomer (a) was prepared by dehydrative condensation of 12-hydroxystearic acid under toluene refluxing in the presence of methanesulfonic acid as the catalyst, and adding to the end carboxyl group of the resulting self-condensed polyester resin having a resin acid value of 30 and a number-average molecular weight of 1,800, glycidyl methacrylate under catalytic action of dimethylaminoethanol, whereby introducing a polymerizable double bond into said polyester resin. The macromonomer (a) had a solid content of 70% and on average about one polymerizable double bond per molecule, based on its weight-average molecular weight.

Separately, 174 parts of butyl acetate was put in a flask and heated under refluxing, into which a mixture of 297 parts of the 70% macromonomer (a) solution, 195.9 parts of methyl methacrylate, 18.5 parts of glycidyl methacrylate, 163.0 parts of xylene and 9.6 parts of 2,2'-azobisisobutyronitrile was dropped at a uniform rate, consuming 3 hours, followed by 2 hours' aging. Then a mixture of 0.05 part of p-t-butylcatechol, 3.8 parts of methacrylic acid and 0.5 part of dimethylaminoethanol was added into the flask, and the system was reacted at 140° C. for about 5 hours until the resin acid value dropped to 0.5, to provide a macromonomer (b) having the solid content of 50%. The resulting macromonomer (b) was a graft polymer having the first segments derived from poly-12-hydroxystearic acid and the second segments attributable to the copolymer of methyl methacrylate and glycidyl methacrylate, and having on average 4 polymerizable unsaturated double bonds per molecule.

Again separately, 153 parts of xylene was put in a flask and heated to 125° C., into which a mixture of 50 parts of 2-ethylhexyl acrylate, 23 parts of n-butyl acrylate, 25 parts of 2-hydroxyethyl acrylate, 2 parts of acrylic acid and 4.5 parts of t-butyl peroctoate was dropped over 4 hours, followed by 2 hours' aging. Thus obtained acrylic resin varnish had a solid content of 65% and a number-average molecular weight of 7,000. To 100 parts of this acrylic resin varnish, 2 parts of glycidyl methacrylate, 0.01 part of 4-t-butyl pyrocatechol and 0.15 part of tetrabutylammonium bromide were added and stirred for 7 hours at 115° C. to introduce copolymerizable double bonds into the resin varnish. Thus a macromonomer (c) was obtained, which contained on average about 1.0 double bond per molecule as introduced therein based on weight-average molecular weight, and had an SP value of 8.70 and hydroxyl value of 121 mgKOH/g.

A flask was charged with 190 parts of heptane, 20 parts of 50% macromonomer (b) solution and 23 parts of 65% macromonomer (c) solution, and into which a mixture of 20 parts of 50% macromonomer (b) solution, 23 parts of 65% macromonomer (c) solution, 50 parts of methyl methacrylate, 50 parts of 2-hydroxyethyl acrylate, 1.5 parts of glycidylmethacrylate, 0.8 part of methacrylic acid and 2 parts of 2,2'-azobisisobutyronitrile was dropped over 5 hours, followed by 2 hours' aging. Then 0.1 part of dimethylaminoethanol was added, again followed by 4 hours' aging, to provide a non-aqueous dispersion of fine polymer particles. Thus obtained dispersion was white and had a solid content of 40%, the fine particles dispersed therein having a size of about 160 nm (peak particle diameter). The particle diameter was measured with COULTER N4-Model Sub-micron Particle Analyzer (Coulter Co.). The particles were insoluble in such organic solvents as acetone, ethyl acetate and xylene.

EXAMPLES AND COMPARATIVE EXAMPLES

Those components (A), (D) and (G), and those as identified in Tables 1–4 were mixed at the ratios as specified in those tables, to provide organic solvent-based high-solide paints (clear paints). The blend ratios of the components (A)–(G) are indicated in terms of the solids by weight.

Performances of the coating films formed of those paints were evaluated by the following methods.

Performance tests (finished appearance, hardness, mar resistance and acid resistance) were conducted with multi-layered coating films which were prepared as follows: an epoxy resin-type cationic electropaint was applied onto a chemically treated cold-stretched dull steel sheet (film thickness: 25 μm); cured under heating at 170° C. for 30 minutes; onto which an inter-coating paint (LUGA-BAKE™ AM, Kansai Paint Co., a polyester resin-melamine resin type paint, gray in color) was applied to a film thickness of 30 μm; cured under heating at 140° C. for 30 minutes; then a metallic paint (TWX™-402, Kansai Paint Co., an acrylic resin-melamine resin type paint) was applied on the top to a film thickness of 18 μm; and further on top of the last coated film which was allowed to stand at room temperature for three minutes and yet was uncured, each of those high solid paints (clear paints) of Examples and Comparative Examples as shown in Tables 1–4 (whose viscosity was adjusted to 50 seconds/Ford Cup #4/20° C.) was applied to a film thickness of 35 μm, followed by heating at 140° C. for 30 minutes to cure the top two layers simultaneously. The results of the performance tests were as given in Tables 1–4.

In Table 1, "NCO/OH molar ratio" shows the molar ratio between hydroxyl groups in component (A) and isocyanate groups in component (B), and "solid concentration at application time" shows the viscosity of high solid paints (clear paints) of the foregoing Examples and Comparative Examples whose viscosity had been adjusted to 50 seconds/Ford Cup #4/20° C., immediately before the application.

Notes (1) to (14) in Tables 1–4 signify the following:

Note (1) (B-1): Desmodur™ N3300, (Sumika Bayer Urethane Co., Ltd.), an isocyanurate type hexamethylene diisocyanate;

Note (2) (B-2): LT™ 1 (Kyowa Hakko Kogyo Co., Ltd.), 2-isocyanato-ethyl-2,6-diisocyanatocaproate, weight-average molecular weight, about 267

Note (3) (C-1): CYMEL™ 325 (Mitsui Cytec Ltd.), an imino-type melamine resin

Note (4) (C-2): CYMEL™ 303 (Mitsui Cytec Ltd.), a completely alkyl-type melamine resin Note (5) (D-4): TONE™ 301 Polyol (Union Carbide Corp.), a hydroxyl-containing oligomer having a hydroxyl value of 561 mgKOH/g and a weight-average molecular weight of 700

Note (6) (E-1): a polymer serving as an alkoxysilyl group-containing compound, which is formed by copolymerization of polymerizable monomeric components comprising an alkoxysilyl-containing vinyl monomer (KBM™ 503, Shin-etsu Chemical Co.) and hydroxyethyl methacrylate, said polymer having a weight-average molecular weight of 3,000 and a hydroxyl value of 82 mgKOH/g Note (7) (F-1): N5543™ (King Industries, Inc., U.S.A.), a solution of amine-neutralized dodecylbenzenesulfonic acid Note (8) (F-2): Scat™ 24 (Sankyo Organic Chemicals Co., Ltd.), a tin catalyst Note (9) (G-2): Setalux™ C-7176 VB-60 (Akzo Nobel NV), a rheology-controlling agent, which is a polyurea compound Note (10): Finished appearance: Appearance of the multi-layered coating surface on each test panel was visually evaluated: ○ signifies all of leveling property, gloss and distinctness-of-image-gloss were good and no abnormality was observed; Δ signifies one or more of leveling property, gloss and distinctness-of-image-gloss was (were) inferior; and X signifies one or more of leveling property, gloss and distinctness-of-image-gloss was (were) markedly inferior.

Note (11): Hardness: Tukon hardness (20° C.) of said multi-layered coating film on each test panel, which was measured with Tukon microhardness tester (American Chain & Cable Company).

Note (12): Mar resistance: On the multi-layered coating film surface on each test panel, polishing powder (DARUMA™ Cleanser) which was stiffly kneaded with water into a paste was placed, on which a tester terminal was applied under a load of 0.5 kg and moved to make a reciprocating motion 25 times. The surface condition of the film thereafter was visually evaluated: ⊙ signifies no change such as gloss deterioration on the surface was observed; ○ signifies very slight gloss deterioration observed on the coated surface; Δ signifies slight gloss deterioration was observed; and X, conspicuous gloss deterioration was observed.

Note (13): Acid resistance: On the multi-layered coating film surface of each test panel, 0.4 cc of 30% aqueous sulfuric acid solution was dropped at plural spots. The surface was dried with a hot air dryer at 60° C. for 15 minute and then washed with water. The condition of the washed surface was visually evaluated: ⊙ signifies no change such as trace of the spots was observed on the coating surface; ○ signifies very slight change such as traces of the spots were observed on the coating surface; Δ signifies slight traces of the spots were observed; and X, notable stains, whitening or swelling were observed at the spots.

Note (14): Weatherability: Gloss retention (60° mirror surface reflectivity) of the coating surfaces after 480 hours' exposure test with Sunshine Weather-O-Meter was examined.

TABLE 1

|  |  | Example | | | Comparative Example | |
|---|---|---|---|---|---|---|
|  |  | 1 | 2 | 3 | 1 | 2 |
| Component (A) | | | | | | |
| (A-1) | | 41 | | | | |
| (A-2) | | | 40 | | | |
| (A-3) | | | | 50 | | |
| (A-4) | | | | | 60 | |
| (A-5) | | | | | | 50 |
| Component (B) | | | | | | |
| (B-1) | Note (1) | 59 | 45 | 50 | 40 | 50 |
| (B-2) | Note (2) | | 15 | | | |
| Component (F) | | | | | | |
| (F-1) | Note (7) | | | 1 | | 1 |
| (F-2) | Note (8) | 0.05 | 0.02 | | 0.05 | |

TABLE 1-continued

|  |  | Example | | | Comparative Example | |
|---|---|---|---|---|---|---|
|  |  | 1 | 2 | 3 | 1 | 2 |
| Component (G) | | | | | | |
| (G-1) | | 2 | 3 | 3 | 3 | 3 |
| (G-2) | Note (9) | 5 | | | | |
| NCO/OH molar ratio | | 1 | 1.3 | 0.96 | 1.1 | 1.4 |
| Performance Test Results | | | | | | |
| Solid concentration at application time | | 85 | 90 | 83 | 75 | 65 |
| Finished appearance | Note (10) | ○ | ○ | ○ | ○ | ○ |
| Hardness | Note (11) | 9 | 9 | 8 | 2 | 4 |
| Mar resistance | Note (12) | ○ | ○ | ○ | Δ | ○ |
| Acid resistance | Note (13) | ○ | ○ | ○ | Δ | Δ |

TABLE 2

|  |  | Example | | | Comparative Example | |
|---|---|---|---|---|---|---|
|  |  | 4 | 5 | 6 | 3 | 4 |
| Component (A) | | | | | | |
| (A-1) | | 20 | | 40 | | 30 |
| (A-2) | | | 35 | | | |
| (A-4) | | | | | 30 | |
| (A-6) | | | | | | 35 |
| Component (B) | | | | | | |
| (B-1) | Note (1) | 50 | 60 | | 50 | 60 |
| (B-2) | Note (2) | | | 40 | | |
| Component (C) | | | | | | |
| (C-1) | Note (3) | 30 | | 20 | | |
| (C-2) | Note (4) | | 5 | | 20 | 5 |
| Component (F) | | | | | | |
| (F-1) | Note (7) | 1 | 1 | | 1 | 1 |
| (F-2) | Note (8) | | | 0.03 | | |
| Component (G) | | | | | | |
| (G-1) | | 5 | 3 | | 5 | 5 |
| (G-2) | Note (9) | | | 5 | | |
| Performance Test Results | | | | | | |
| Solid concentration at application time | | 76 | 81 | 80 | 78 | 69 |
| Finished appearance | Note (10) | ○ | ○ | ○ | ○ | × |
| Hardness | Note (11) | 13 | 12 | 12 | 4 | 8 |

TABLE 2-continued

|  |  | Example | | | Comparative Example | |
|---|---|---|---|---|---|---|
|  |  | 4 | 5 | 6 | 3 | 4 |
| Mar resistance | Note (12) | ○ | ○ | ○ | Δ | ○ |
| Acid resistance | Note (13) | ○ | ○ | ○ | Δ | Δ |
| Weatherability | Note (14) | 98 | 88 | 96 | 78 | 75 |

TABLE 3

|  |  |  | Example | | | Comparative Example | | |
|---|---|---|---|---|---|---|---|---|
|  |  |  | 7 | 8 | 9 | 5 | 6 | 7 |
| Component (A) | (A-1) | | 30 | | 28 | | 30 | |
|  | (A-2) | | | 35 | | | | |
|  | (A-4) | | | | | 30 | | |
| Component (B) | (B-1) | Note (1) | 45 | 50 | 35 | 45 | 45 | 30 |
|  | (B-2) | Note (2) | | | 10 | | | |
| Component (C) | (C-1) | Note (3) | | | 7 | | | |
|  | (C-2) | Note (4) | 5 | 5 | | 5 | 5 | 5 |
| Component (D) | (D-1) | | 20 | | 10 | 20 | | 65 |
|  | (D-2) | | | 10 | | | | |
|  | (D-3) | | | | | | 20 | |
|  | (D-4) | Note (5) | | | 10 | | | |
| Component (F) | (F-1) | Note (7) | 1 | 1 | | 1 | 1 | 1 |
|  | (F-2) | Note (8) | | | 0.05 | | | |
| Component (G) | (G-1) | | 5 | 3 | | 5 | 5 | 5 |
|  | (G-2) | Note (9) | | | 5 | | | |
| Performance Test Results | Solid concentration at application time | | 78 | 81 | 80 | 78 | 69 | 66 |
|  | Finished appearance | Note (10) | ○ | ○ | ○ | ○ | Δ | ○ |
|  | Hardness | Note (11) | 10 | 12 | 12 | 4 | 12 | 7 |
|  | Mar resistance | Note (12) | ○ | ○ | ○ | Δ | ○ | Δ |
|  | Acid resistance | Note (13) | ○ | ○ | ○ | Δ | ○ | Δ |

TABLE 4

|  |  |  | Example | | | Comparative Example | | | | |
|---|---|---|---|---|---|---|---|---|---|---|
|  |  |  | 10 | 11 | 12 | 8 | 9 | 10 | 11 | 12 |
| Component (A) | (A-1) | | 28 | | 28 | | 30 | | | |
|  | (A-2) | | | 30 | | | | | 40 | 30 |
|  | (A-4) | | | | | 20 | | | | |
| Component (B) | (B-1) | Note (1) | 45 | 50 | 30 | 45 | 48 | 30 | 45 | 45 |
|  | (B-2) | Note (2) | | | 10 | | | | | |
| Component (C) | (C-1) | Note (3) | | | 7 | | 5 | | 15 | 5 |
|  | (C-2) | Note (4) | 5 | 5 | | 5 | | 5 | | |
| Component (D) | (D-1) | | 17 | | 10 | 20 | | 65 | | |
|  | (D-2) | | | 5 | | | | | | 20 |
|  | (D-3) | | | | | | 17 | | | |
|  | (D-4) | Note (5) | | | 10 | | | | | |

TABLE 4-continued

|  |  |  | Example | | | Comparative Example | | | | |
|---|---|---|---|---|---|---|---|---|---|---|
|  |  |  | 10 | 11 | 12 | 8 | 9 | 10 | 11 | 12 |
| Component (E) | (E-1) | Note (6) | 5 | 10 | 5 | 10 |  |  |  |  |
| Component (F) | (F-1) | Note (7) | 1 | 1 |  | 1 | 1 | 1 |  | 1 |
|  | (F-2) | Note (8) |  |  | 0.05 |  |  |  | 0.05 |  |
| Component (G) | (G-1) |  | 5 | 3 |  | 5 | 5 | 5 |  | 5 |
|  | (G-2) | Note (9) |  |  | 5 |  |  |  | 5 |  |
| Performance Test Results | Solid concentration at application time |  | 78 | 81 | 80 | 76 | 66 | 66 | 70 | 78 |
|  | Finished appearance Note (10) |  | ○ | ○ | ○ | ○ | Δ | ○ | Δ | ○ |
|  | Hardness Note (11) |  | 13 | 14 | 14 | 5 | 10 | 7 | 8 | 11 |
|  | Mar resistance Note (12) |  | ⊚ | ⊚ | ⊚ | Δ | ○ | Δ | Δ | ○ |
|  | Acid resistance Note (13) |  | ⊚ | ⊚ | ⊚ | Δ | ○ | Δ | × | ○ |

What is claimed is:

1. A paint composition which comprises (A) a hydroxyl-containing compound having a weight-average molecular weight not more than 1,000 and a hydroxyl value of 200–800 mgKOH/g, and (B) a polyisocyanate compound, (C) an imino-containing melamine resin and (F) an organotin compound as a curing catalyst, said hydroxyl-containing compound (A) being a ring-opening esterification reaction product between a carboxyl-containing compound and epoxy-containing compound.

2. The paint composition according to claim 1, in which the carboxyl-containing compound is a hydroxy acid.

3. The paint composition according to claim 1, in which the epoxy-containing compound is a glycidyl ester epoxy-containing compound.

4. The paint composition according to claim 1, in which the hydroxyl-containing compound (A) has a weight-average molecular weight of 250–850 and a hydroxyl value of 200–700 mgKOH/g.

5. The paint composition according to claim 1, in which the polyisocyanate compound (B) is selected from a group consisting of hexamethylene diisocyanate, methylenebis(cyclohexyl isocyanate), isophorone diisocyanate, dimers and trimers of the foregoing and isocyanate-containing prepolymers derived from the foregoing diisocyanate.

6. The paint composition according to claim 1, in which the polyisocyanate compound (B) has a number-average molecular weight of 200–1,000.

7. The paint composition according to claim 1, which comprises said hydroxyl-containing compound (A) and polyisocyanate compound (B) at a ratio, as converted to NCO/OH molar ratio, within a range of 0.5/1 to 2/1.

8. A paint composition according to claim 1, which comprises, based on the total solid contents of the components (A), (B) and (C), 10–60% by weight of the hydroxyl-containing resin (A), 30–70% by weight of the polyisocyanate compound (B) and 3–40% by weight of the melamine resin (C).

9. A paint composition according to claim 1, which further contains (D) a hydroxyl-containing resin having a weight-average molecular weight of 500–6,000 and a hydroxyl value of 50–600 mgKOH/g.

10. The paint composition according to claim 9, in which the hydroxyl-containing resin (D) is a hydroxyl-containing polyester resin or a hydroxyl-containing acrylic resin.

11. The paint composition according to claim 9, in which the hydroxyl-containing resin (D) has a weight-average molecular weight of 1,000–5,200 and a hydroxyl value of 70–450 mgKOH/g.

12. The paint composition according to claim 9, in which the hydroxyl-containing resin (D) has an acid value not higher than 15 mgKOH/g.

13. The paint composition according to claim 9, which comprises, based on the total solid contents of the components (A), (B), (C) and (D), 5–50% by weight of the hydroxyl-containing compound (A), 30–70% by weight of the polyisocyanate compound (B), 3–30% by weight of the melamine resin (C) and 5–50% by weight of the hydroxyl-containing resin (D).

14. The paint composition according to claim 9, which further comprises (E) an alkoxysilyl-containing compound.

15. The paint composition according to claim 14, in which the alkoxysilyl-containing compound (E) is a polymer obtained by (co)polymerizing at least one polymerizable unsaturated group-containing alkoxysilane compound, optionally with other polymerizable unsaturated monomer(s).

16. The paint composition according to claim 14, in which the alkoxysilyl-containing compound (E) has a weight-average molecular weight of 150–50,000.

17. The paint composition according to claim 14, which comprises, based on the total solid contents of the components (A), (B), (C), (D) and (E), 5–50% by weight of the hydroxyl-containing compound (A), 30–70% by weight of the polyisocyanate compound (B), 3–30% by weight of the melamine resin (C), 5–50% by weight of the hydroxyl-containing resin (D) and 1–30% by weight of the alkoxysilyl-containing compound (E).

18. A paint composition according to claim 1, which further comprises (G) a rheology-controlling agent.

19. A paint composition according to claim 1, whose solid concentration is at least 70% by weight.

20. A paint composition according to claim 19, whose solid concentration is 75–90% by weight.

21. A paint composition according to claim 1, which is in the form of a two-liquid system.

22. A process for forming multi-layered coating film comprising at least one layer of coloring coating and at least one layer of transparent coating, which process is characterized by forming the top layer transparent coating with the paint composition which is described in claim 1.

23. Articles coated with a paint composition as defined by claim 1.

* * * * *